(12) United States Patent
Tangen

(10) Patent No.: US 6,944,695 B1
(45) Date of Patent: Sep. 13, 2005

(54) METHOD AND APPARATUS FOR CONNECTING DEVICES TO A BUS

(75) Inventor: Wayne A. Tangen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 10/107,725

(22) Filed: Mar. 25, 2002

(51) Int. Cl.[7] .............................................. G06F 13/00
(52) U.S. Cl. ...................... 710/107; 710/108; 710/110; 710/100
(58) Field of Search .......................... 710/10, 104, 106, 710/108–110, 305

(56) References Cited

U.S. PATENT DOCUMENTS

| | | | |
|---|---|---|---|
| 6,363,437 B1 * | 3/2002 | Ptasinski et al. | 710/10 |
| 6,629,172 B1 * | 9/2003 | Andersson et al. | 710/104 |
| 6,745,270 B1 * | 6/2004 | Barenys et al. | 710/104 |

* cited by examiner

*Primary Examiner*—Tim Vo

(57) ABSTRACT

A two-wire serial (TWS) bus allows bus mastering by any device on the bus utilizing pull-ups. The bus is actively driven low, but typically pulled high by pull-up resistors for each device on the bus. When some of the devices on such a bus have backup power, draining of backup power whenever primary power is lost is avoided by isolating the devices with backup power from the devices without backup power on the TWS bus.

8 Claims, 2 Drawing Sheets

METHOD AND APPARATUS FOR CONNECTING DEVICES TO A BUS

FIELD OF THE INVENTION

The present invention generally relates to electrical buses.

BACKGROUND OF THE INVENTION

The I2bus was developed in the early 1980's to provide an easy way to connect a computer processor unit (CPU) to other peripheral semiconductor devices located in a television set.

Normal computer systems typically use byte-wide or wider buses to accomplish this task. This solution results in a large number of copper tracks on printed circuit boards (PCB's) to route the Address and Data lines required, not to mention the number of address decoders and glue logic required to connect everything. In mass production items such as television sets, video cassette recorders, and audio equipment, this is not an acceptable solution. In these items, each and every component counts regarding the cost of the item- and one component fewer means more money for the producer and a cheaper item for the customer.

Furthermore, a large number of control lines implies that a system is more susceptible to disturbances by Electromagnetic Compatibility (EMC) and Electrostatic Discharge (ESD). The research done by Philips Labs in Eindhoven (The Netherlands) resulted in a two-wire communication bus called the I2bus. I2is an acronym for Inter-IC bus. The I2bus' name literally explains its purpose: to provide a communication link between Integrated Circuits.

Today, the extent of this bus extends much further than audio and video equipment. The I2bus has been generally accepted in industry. Offspring of the I2C bus like D2B bus and ACCESS bus have found their ways into computer peripherals such as keyboards, mice, printers, monitors, etc. The I2bus and progeny have been adopted by several leading chip manufacturers, such as Xicor, SGS-Thomson, Siemens, Intel, TI, Maxim, Atmel, and Analog Devices.

An I2bus physically consists of two active wires and a ground connection. The active wires, "SDA" and "SCL", are both bidirectional, where SDA is the serial data line and SCL is the serial clock line. Both of these lines are initially bidirectional. This means that these lines can be driven either by the chip or from the outer world. To avoid "the fried chip" effect where a semiconductor die has been damaged, these bus signal lines typically use open-collector or open-drain (depending on the technology) outputs.

The interface with an I2bus (and its progeny) is constructed around an input buffer and an open-drain or open-collector transistor. When nothing is happening on the bus, the two bus lines are in a logic HIGH state or Asserted state. To put some information on the bus, a semiconductor die drives its output transistor, thus pulling the bus to a logic LOW state or a logic negated level state. Typically, an external PULL-UP resistor is then utilized to pull the bus lines back to a logic HIGH state when released by the chip. When the bus is IDLE (nothing going on), both lines are at a logic HIGH state. These pull-up resistors in the devices are often actually small current sources or may be nonexistence.

One advantage of this bus concept is that it has a "built-in" bus mastering technique. Whenever the bus is "occupied" by a semiconductor die that is sending a 0, all other semiconductor dice lose their capability to master the bus themselves and to transmit any logic state.

However, the open collector technique has drawbacks too. Typically, there is a slight current consumption in the bus due to the required pull-ups. This is not typically a problem when a system is utilizing alternating current (AC) power. However, a problem does arise when AC power to the devices on the bus is lost, and some of the devices on the bus have battery backup and others do not. In that case, that pull-up caused current loss will often result as the battery backups are drained. Possibly more important, if some devices lose AC power, they might pull the bus low, thus preventing its operation, while those devices having battery backup require the bus to remain operational during the power outage.

It would thus be advantageous to be able to connect devices with battery backup to a two-wire serial (TWS) bus, such as an I2bus, without having the bus drain the battery backups. It would also be advantageous to allow devices to connect and disconnect from a two wire serial bus without corrupting that bus.

BRIEF SUMMARY OF THE INVENTION

A TWS bus allows bus mastering by any device on the bus utilizing pull-ups. An embodiment according to the present invention allows a first set of devices on the bus, such as those without battery backup, to be isolated from a second set of devices on the bus, such as those with backup power, by use of switches controlled by a control circuit. The first set of devices are disconnected from the second set when a control circuit signal from the control circuit is negated, and reconnected when the control circuit signal is asserted.

DETAILED DESCRIPTION

A TWS bus allows bus mastering by any device on the bus utilizing pull-ups. The bus is actively driven to a logic LOW state, but typically pulled to a logic HIGH state by pull-up resistors for each device on the bus. When some of the devices on such a bus have backup power, draining of backup power whenever primary power is lost is avoided by isolating the devices with backup power from the devices without backup power on the TWS bus by use of analog switches controlled by a partially gated S/R latch and a control circuit. The control circuit detects primary power loss and causes the switches to disconnect the devices without backup from the bus. Then, when primary power is regained, the S/R latch causes the switches to reconnect these devices to the bus when the active bus traffic will not be corrupted.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "ASSERT" or logic "HIGH" and logic "NEGATE" or logic "LOW" will be used when referring to the rendering of a signal, status bit, or similar apparatus into its logically true or logically false state, respectively. If the logically true state is a logic level one (1), the logically false state will be a logic state level zero (0). And if the logically true state is a logic state level zero (0), the logically false state will be a logic level one (1).

Figure 1:
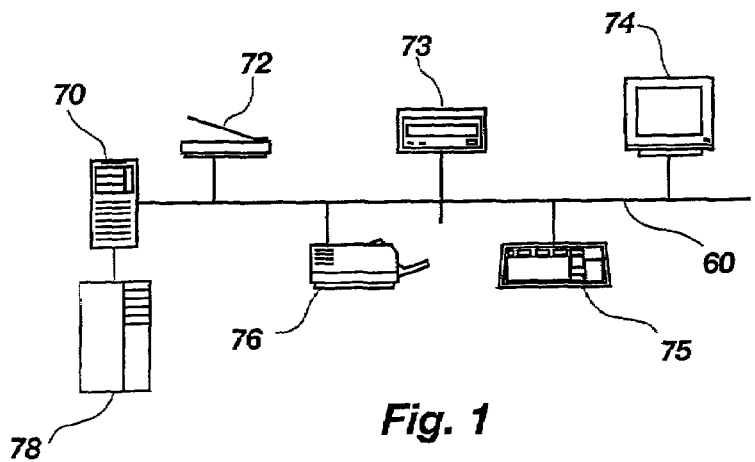
FIG. 1 is a block diagram illustrating a TWS bus coupling a plurality of devices, in accordance with an embodiment of the present invention.

FIG. 1 is a block diagram illustrating a TWS bus 60 coupling a plurality of devices, in accordance with an embodiment of the present invention. In this FIG., the TWS bus 60 couples a computer 70, a scanner 72, a CD burner 73, a monitor 74, a keyboard 75, and a printer 76. This is illustrative only. In one embodiment of the present invention, the two-wire serial bus 60 is a TWS bus contained in a Titan product sold by Hewlett-Packard Company, Palo Alto, Calif., that utilizes the I2bus protocol, but varies slightly from the standard I2bus in its electrical performance specifications. Other serial buses are also within the scope of this invention. Additionally, other types of devices coupled to the TWS bus 60 are also within the scope of this invention. In an embodiment of the present invention, one or more of the devices coupled to the TWS bus 60 contain or are coupled to a battery or capacitor backup 78. In this FIG., the computer 70 is the device that has a UPS battery backup 78.

Figure 2:
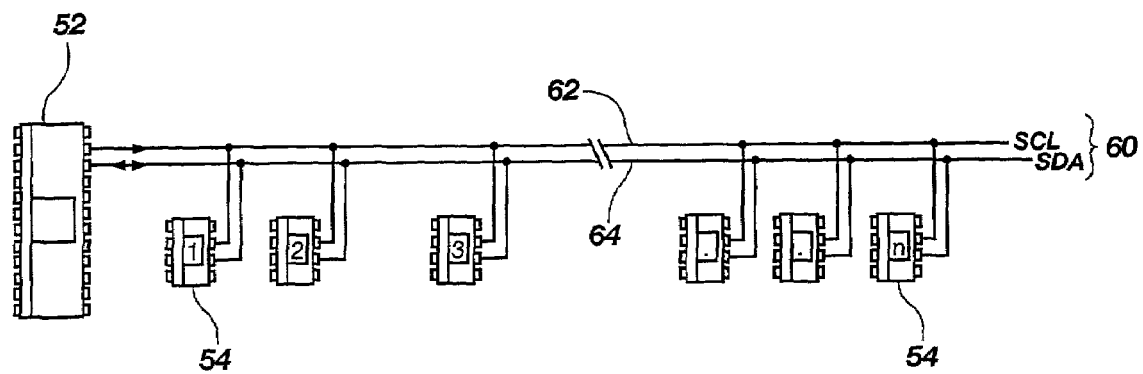
FIG. 2 is a block diagram illustrating the TWS bus shown in FIG. 1 in more detail.

FIG. 2 is a block diagram illustrating the TWS bus 60 shown in FIG. 1 in more detail. The TWS bus 60 consists of two wires: a serial clock ("SCL") line 62 and a serial data ("SDA") line 64. Both of these wires are bidirectional. In FIG. 2, seven interface semiconductor die 52, 54 are shown coupled to the TWS bus 60. One of these is a master interface semiconductor die 52. The other interface chips are slave interface semiconductor die 54. Note that in the I2protocol, a plurality of the devices coupled to the bus may at some time or another operate as the bus master. Thus, the arrangement in FIG. 2 is illustrative only, with a typical TWS bus 60 allowing multiple bus masters, but only one bus master at any specific time.

The TWS bus interface is constructed around an input buffer and an open-drain or open-collector transistor. When nothing is happening on the bus, the bus lines are in a logic HIGH (or ASSERTED) state. A device negates or drives one or both of the bus lines low in order to communicate. In the prior art, each interface semiconductor die utilized an external pull-up resistor to reassert or drive the bus line(s) back high when released by a device. These pull-up resistors typically result in some current consumption. As noted above, this current loss can become a problem when some of the devices coupled to the TWS bus 60 are utilizing a battery backup. Probably more important, a problem can be caused by a device that incorporates ESD protection diodes connected from VCC to its bus lines; when VCC goes to zero, these diodes can pull the bus down.

Figure 3:
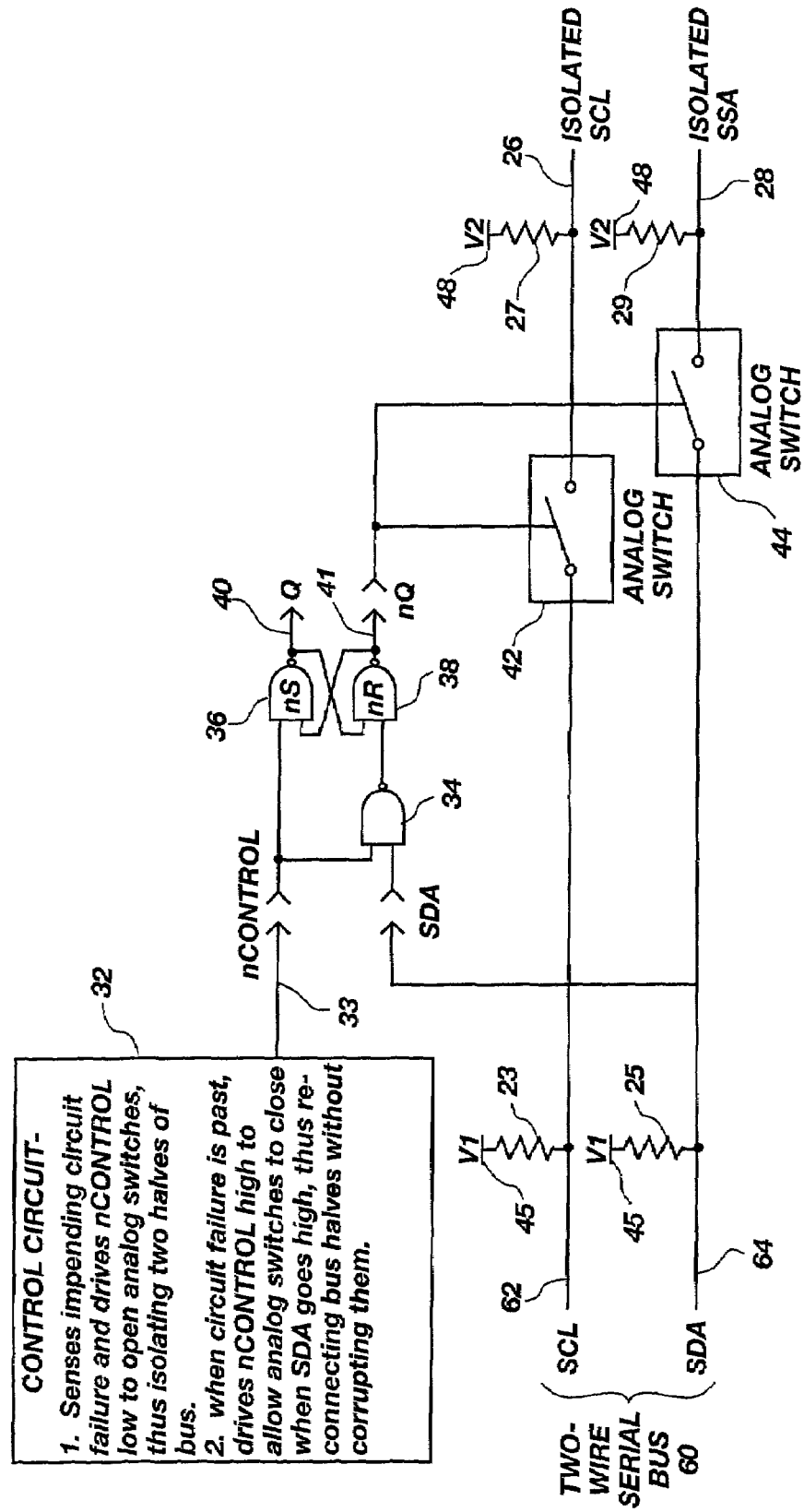
FIG. 3 is a block diagram illustrating a portion of the interface circuits shown in FIG. 2, in accordance with an embodiment of the present invention.

FIG. 3 is a block diagram illustrating a portion of the interface circuits 52, 54 shown in FIG. 2, in accordance with an embodiment of the present invention. The TWS bus 60 consists of a serial data (SDA) line 64 and a serial clock (SCL) line 62. Both the SDA 64 and SCL 62 lines have pull-up resistors 25, 23 (respectively) which allow the TWS bus 60 lines to be pulled up to a first reference voltage (V1) 45 when the TWS bus lines 62, 64 are no longer driven low. There is also an isolated portion of the TWS bus 60 comprising an isolated SCL 26 and an isolated SDA 28. The bus SCL 62 and SDA 64 lines are isolated from the isolated SCL 26 and isolated SDA 28 by a pair of analog switches 42, 44 (respectively). The isolated bus SCL 26 and SDA 28 further have pull-up resistors 27, 29 (respectively) pulling the Isolated bus lines up to a second reference voltage (V2) 48. In one embodiment of the present invention, devices having battery backup will be connected to SCL 62 and SDA 64, since it is their bus traffic that determines when the analog switches 42, 44 can be safely closed. Devices that could lose power will preferably be connected to the isolated bus SCL 26 and SDA 28.

The two analog switches 42, 44, are controlled by the inverted output (nQ) 41 of a partially gated S/R latch comprised of a two-input nS NAND gate 36 cross coupled to a two-input nR NAND gate 38, with the output of the nR NAND gate 38 providing the inverted output (nQ) 41 that controls the two analog switches 42, 44. The output (Q) 40 of the nS NAND gate 36 provides one of the inputs to the nR NAND gate 38, while the output (nQ) 41 of the nR NAND gate 38 provides one of the inputs to the nS NAND gate 36. The second input to the nS NAND gate 36 is an nCONTROL signal 33 generated by a control circuit 32. The second input to the nR NAND gate 38 is a gating two-input NAND gate 34. The two inputs to this gating NAND gate 34 are the nCONTROL signal 33 and the SDA signal 64.

The control circuit 32 that generates the nCONTROL signal 33 operates by sensing impending circuit failure and negating the nCONTROL signal 33 to open the analog switches 42, 44, thus isolating the primary TWS bus signals 62, 64 from the Isolated bus signals 26, 28. When the circuit failure is past, the control circuit 32 asserts the nCONTROL signal 33 to allow the analog switches 42, 44 to close when SDA 64 is high, thus reconnecting the two bus halves without corrupting them.

Thus, when the control circuit 32 negates the nCONTROL signal 33, the nS NAND gate 36 output (Q) 40 is asserted. This also causes the gating NAND gate 34 output to be asserted. When both of these outputs are asserted, the nR NAND gate 38 generates a negated output (nQ) 41, which causes both analog switches 42, 44 to open, isolating the two bus halves. The analog switches 42, 44 remain open as long as the Control Circuit 32 continues to negate the nCONTROL signal 33.

Then, when the control circuit 32 asserts the nCONTROL signal 33, the gating NAND gate 34 continues to assert its output as long as the SDA signal 64 is low. This combined with the asserted output (Q) 40 signal from the nS NAND gate 36 causes the output (nQ) 41 signal from the nR NAND gate 38 to remain negated. However, when the SDA signal 64 becomes high while the nCONTROL signal 33 is being asserted, the gating NAND gate 34 output is negated, which in turn causes the nR NAND gate 38 to assert its output (nQ) 41 signal, which in turn causes the two analog switches 42, 44 to close, reconnecting the two halves of the bus. When both the nR NAND gate 38 output (nQ) 41 and the nCONTROL signal 33 are asserted, the nS NAND gate 36 generates a negated output (Q) 40 signal. The two analog switches 42, 44 remain closed until the control circuit 32 again negates its nCONTROL signal 33 output.

This one embodiment of the present invention utilizes a single gating NAND gate 34 to prevent closing the two analog switches 42, 44 until both the SDA signal 64 becomes high and the nCONTROL signal 33 is asserted. Thus, the SDA signal 64 acts as an "Enable" signal for reconnecting the bus halves, but not for disconnecting the bus halves.

In an alternate embodiment of the present invention, the "Enable" signal for the partial or full S/R latch gating is provided by an AND of both the SDA 64 and SCL 62 signals. Thus, the TWS bus signals must both be high before the bus halves can be reconnected.

Those skilled in the art will recognize that modifications and variations can be made without departing from the invention. Therefore, it is intended that this invention encompass all such variations and modifications as fall within the scope of the appended claims. For example, NOR gates can be used to replace NAND gates utilizing well recognized techniques, and packaged flip-flops may be utilized.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. An apparatus for connecting at least one of a plurality of devices to a two-wire serial bus having a primary bus having a primary bus first bus line and a primary bus second bus line, comprising:
   an isolated bus having an isolated bus first bus line and an isolated bus second bus line;
   a first circuit for individually generating a control signal at one of the at least one of a plurality of devices coupled via the isolated bus to the two-wire serial bus; and
   a second circuit for disconnecting the isolated bus first bus line from the primary bus first bus line when a control signal is negated and the second circuit for connecting the isolated bus first bus line to the primary bus first bus line when the control signal is being asserted, the second circuit including:
   a first NAND gate having a first NAND gate first input, a first NAND gate second input coupled to the control signal, and a first NAND gate output;
   a second NAND gate having a second NAND gate first input, a second NAND gate second input, and a second NAND gate output, wherein:
     the first NAND gate output is coupled to the second NAND gate first input;
     the second NAND gate output is coupled to the first NAND gate first input;
   a third NAND gate having a third NAND gate first input coupled to the control signal, a third NAND gate second input coupled to the primary bus first bus line, and a third NAND gate output coupled to the second NAND gate second input;
   a first analog switch coupled between the primary bus first bus line and the isolated bus first bus line and controlled by the second NAND gate output; and
   a second analog switch coupled between the primary bus second bus line and the isolated bus second bus line and controlled by the second NAND gate output.

2. The apparatus in claim 1, further comprising:
   a circuit for negating the control signal when an external power disruption is detected; and
   a circuit for asserting the control signal when the external power disruption is over.

3. The apparatus in claim 1, wherein:
   the two-wire serial bus comprises an I2bus.

4. The apparatus in claim 1, wherein:
   the isolated bus is coupled to the at least one of a plurality of devices powered by a battery backup device.

5. The apparatus in claim 1, further comprising:
   a circuit for negating the control signal when an impending circuit failure is detected; and
   a circuit for asserting the control signal when a circuit failure is past.

6. The apparatus in claim 1, wherein:
   the isolated bus is coupled to the at least one of a plurality of devices that is coupled to and powered by a battery backup device.

7. The apparatus in claim 4, wherein:
   the impending circuit failure comprises a loss of AC power.

8. An apparatus for connecting devices to a two-wire serial bus having a primary bus having a primary bus first wire and a primary bus second wire and an isolated bus having an isolated bus first wire and an isolated bus second wire, comprising:
   a control circuit generating a control signal;
   a first NAND gate having a first NAND gate first input, a first NAND gate second input coupled to the control signal, and a first NAND gate output;
   a second NAND gate having a second NAND gate first input, a second NAND gate second input, and a second NAND gate output, wherein:
     the first NAND gate output is coupled to the second NAND gate first input;
     the second NAND gate output is coupled to the first NAND gate first input;
   a third NAND gate having a third NAND gate first input coupled to the control signal, a third NAND gate second input coupled to the primary bus first wire, and a third NAND gate output coupled to the second NAND gate second input;
   a first analog switch coupled between the primary bus first wire and the isolated bus first wire and controlled by the second NAND gate output; and
   a second analog switch coupled between the primary bus second wire and the isolated bus second wire and controlled by the second NAND gate output.

* * * * *

UNITED STATES PATENT AND TRADEMARK OFFICE
CERTIFICATE OF CORRECTION

PATENT NO. : 6,944,695 B1 Page 1 of 1
APPLICATION NO. : 10/107725
DATED : September 13, 2005
INVENTOR(S) : Wayne A. Tangen It is certified that error appears in the above-identified patent and that said Letters Patent is hereby corrected as shown below:

In column 1, line 10, delete "I2bus" and insert -- I2C bus --, therefor.

In column 1, line 30, delete "I2bus. I2is" and insert -- I2C bus. I2C is --, therefor.

In column 1, line 31, delete "I2bus' name" and insert -- I2C bus' name --, therefor.

In column 1, line 34, delete "I2bus" and insert -- I2C bus --, therefor.

In column 1, line 38, delete "I2bus" and insert -- I2C bus --, therefor.

In column 1, line 41, delete "I2bus" and insert -- I2C bus --, therefor.

In column 1, line 50, delete "I2bus" and insert -- I2C bus --, therefor.

In column 2, line 16, delete "I2bus" and insert -- I2C bus --, therefor.

In column 3, line 25, delete "I2bus" and insert -- I2C bus --, therefor.

In column 3, line 26, delete "I2bus" and insert -- I2C bus --, therefor.

In column 3, line 43, delete "I2protocol" and insert -- I2C protocol --, therefor.

In column 6, line 10, in Claim 3, delete "I2bus" and insert -- I2C bus --, therefor.

Signed and Sealed this

Eighth Day of September, 2009

David J. Kappos
*Director of the United States Patent and Trademark Office*